United States Patent
Gray et al.

(10) Patent No.: US 7,602,792 B2
(45) Date of Patent: Oct. 13, 2009

(54) RECONFIGURABLE PROTOCOLS AND ARCHITECTURES FOR WIRELESS NETWORKS

(75) Inventors: Andrew A. Gray, Pasadena, CA (US); Clayton M. Okino, Pasadena, CA (US); Payman Arabshahi, Pasadena, CA (US); Tsun-Yee Yan, Northridge, CA (US)

(73) Assignee: California Institute of Technology, Pasadena, CA (US)

( * ) Notice: Subject to any disclaimer, the term of this patent is extended or adjusted under 35 U.S.C. 154(b) by 1140 days.

(21) Appl. No.: 10/318,477

(22) Filed: Dec. 13, 2002

(65) Prior Publication Data

US 2004/0017829 A1    Jan. 29, 2004

Related U.S. Application Data

(60) Provisional application No. 60/340,691, filed on Dec. 14, 2001.

(51) Int. Cl.
*H04J 3/16* (2006.01)
(52) U.S. Cl. .................. 370/395.5; 370/469; 709/221
(58) Field of Classification Search .......... 370/395.5, 370/465–469; 709/203, 221, 228, 230; 713/151; 715/733

See application file for complete search history.

(56) References Cited

U.S. PATENT DOCUMENTS

| | | | | |
|---|---|---|---|---|
| 5,499,343 A | | 3/1996 | Pettus | |
| 5,568,525 A | * | 10/1996 | de Nijs et al. | 375/356 |
| 5,872,919 A | * | 2/1999 | Wakeland | 709/230 |
| 5,918,016 A | * | 6/1999 | Brewer et al. | 709/220 |
| 6,301,633 B1 | * | 10/2001 | Chapman | 710/305 |
| 6,496,858 B1 | * | 12/2002 | Frailong et al. | 709/221 |
| 6,721,872 B1 | * | 4/2004 | Dunlop et al. | 712/28 |
| 2001/0003191 A1 | * | 6/2001 | Kovacs et al. | 709/226 |
| 2002/0018487 A1 | * | 2/2002 | Chen et al. | 370/465 |
| 2003/0110301 A1 | * | 6/2003 | Han | 709/249 |

* cited by examiner

*Primary Examiner*—William Trost, IV
*Assistant Examiner*—Roberta A Shand
(74) *Attorney, Agent, or Firm*—Daniel L. Dawes

(57) ABSTRACT

A reconfigurable architecture for wireless digital data and voice communications is provided for ad hoc and/or an ad hoc collection of organized networks. At least some user wireless communication units serve as relay stations for other users units, enabling any user within the range of another, participating user to gain access to the local- and wider-area networks in a multihop process. Reconfigurable hardware enables dynamic protocol "preferencing", and easy upgrades to potential future wireless protocol standards. Power-efficient communication takes place by using multihop radio communication at the local level and high-speed point-to-point links (e.g. fiber, satellite) at the global level. Microcells within a network community are aggregated into cells by use of a local-area-network (LAN) backbone of higher speed wireless and/or wired connections. Every time a microcell connects to the wireless backbone, microcells or individual users in surrounding blocks can also connect to the network.

7 Claims, 5 Drawing Sheets

RECONFIGURABLE PROTOCOLS AND ARCHITECTURES FOR WIRELESS NETWORKS

RELATED APPLICATIONS

The present application is related to U.S. Provisional Patent Application, Ser. No. 60/340,691, filed on Dec. 14, 2001, which is incorporated herein by reference and to which priority is claimed pursuant to 35 USC 119.

BACKGROUND OF THE INVENTION

1. Field of the Invention

The invention relates to the field of computer networks and in particular to wireless networks in which there is no standard or shared protocol.

2. Description of the Prior Art

Current commercial wireless communication architectures for computer networks are characterized by low effective bandwidth per user and are not well suited to low-cost, rapid scaling or expansion in large metropolitan areas. Current commercial wireless networks are usually limited in geographic extent and find applications only in special environments where multiple users are closely bound together by a common organizational association of some sort, which allows the imposition of a shared protocol and location for those users.

Developing outside of commercial wireless networks are more than two dozen noncommercial community wireless networking organizations established by volunteers in North America and several European countries.

A conventional wired computer network is a group of computers connected by physical cabling, either network cabling inside a building or telephone lines or data circuits outside a building. Traditionally, such connectivity has used copper wires to carry the electrical signals. Over the past two decades, fiber optic cable has become commonly used and is now included in this class of "wired" connectivity.

Over the past few years, a new way to create network connections has emerged which does not use wires. It is called wireless connectivity. Wireless connections all use some form of radio waves, e.g. microwaves at the higher end, to carry data from a transmitter to a receiver. Four different categories of wireless communications are generally used for network connectivity: radio, microwave, infrared, and satellite. Satellite is different from microwave only because its transmitter/receiver is not earth-bound. Satellites use microwave frequencies to carry their signals. All wireless technologies use standard computer networking technology saddled over a wireless medium: the airwaves. Because signals are transmitted across space, there is no cable between network access points, and, therefore, no monthly line charges for leasing a physical wire. This is wireless connectivity's major advantage.

Community wireless networking is the organization of a plurality of wireless users within radio range of each other, which share a common network protocol so that they can communicate with each other and use common resources. They are interconnected through radio links as opposed to hardwired lines, but when wirelessly interconnected, they can then tap into the hardwired network of the wirelessly connected user. As these wireless community networks develop, a plurality of different network protocols are adopted with no single protocol being used by all. While software translation between different network protocols is possible, such software translation requires a substantial amount of computing in a general microprocessor with unlimited electrical power. The major limitation of such community wireless networks is the need for a common protocol among all of them and the inability to undertake multihops within a wireless network or between multiple wireless networks.

Therefore what is needed is a low-power means for universally connecting or communicating multiple wireless networks together which use different network protocols.

BRIEF SUMMARY OF THE INVENTION

The network or networks of the invention are readily expanded and reconfigured. What is disclosed is a scalable or reconfigurable architecture for wireless digital data and voice communications via ad hoc and/or an ad hoc collection of organized networks. This architecture departs from current commercial wireless communication architectures, which are characterized by low effective bandwidth per user and are not well suited to low-cost, rapid scaling in large metropolitan areas.

One of the basic principles of this architecture is that of a hierarchy of networks, built on local community networking via shared resources with enough flexibility to provide service on demand and to enable growth as the need arises. In the proposed architecture, at least some user wireless communication units serve as relay stations for other users units, enabling any user within the range of another, participating user to gain access to the local- and wider-area networks in a multihop manner. The success of the architecture depends on the development of an energy-efficient, multihop, ad hoc network routing protocol. This is implemented in reconfigurable hardware to enable dynamic protocol "preferencing", and easy upgrades to potential future wireless protocol standards.

Power-efficient communication takes place by multihop radio at the local level and via high-speed point-to-point links (e.g. fiber, satellite) at the global level. In a typical community, the home of each user is equipped with a rooftop radio transceiver that, together with a number of neighboring similar units, is a member of a microcell. Each such unit is capable of communicating with a central unit of the microcell, either directly or by relay via one of the other members. When at home, a user's telephone, personal digital assistant (PDA), laptop computer with wireless modem, or other communication device connects with the network via the in-home wireless link and the rooftop transceiver. When out of range of the in-home wireless link, the user connects to the network via someone else's roof-top transceiver, or portable wireless device, in a multihop fashion.

Microcells within a community are aggregated into cells by use of a local-area-network (LAN) backbone of higher speed wireless and/or wired connections. Every time a microcell connects to the wireless backbone, microcells or individual users in surrounding blocks can also connect to the network. Repeating this process, a network serving a wider area is provided. At various locations, the wireless traffic is placed on the Internet backbone.

In particular the invention is an apparatus for reconfiguring a plurality of networks, each having a different network protocol into an intercommunicated network. The apparatus comprises a protocol stack and a reconfigurable protocol chip coupled the protocol stack. The protocol stack comprises an application layer, a transport layer, a network layer, a data link layer and a physical layer which are serially intercommunicated to each other. The network layer and data link layer are included at least in part in the reconfigurable protocol chip.

The transport layer and physical layer are communicated to the reconfigurable protocol chip.

The reconfigurable protocol chip is comprised of a dynamically reconfigurable protocol realization module communicated to the physical layer, a protocol sensing module communicated to the physical layer, a reconfiguration control engine communicated to the protocol sensing module and to the dynamically reconfigurable protocol realization module, a protocol selection module communicated to the protocol sensing module and to the reconfiguration control engine; and a memory for storing a plurality of different network protocols.

In a first embodiment the dynamically reconfigurable protocol realization module is implemented within a dynamic field programmable gate array. The protocol sensing module, the reconfiguration control engine, and the protocol selection module are implemented within a control field programmable gate array. The memory is implemented in a flash memory.

In a second embodiment the dynamically reconfigurable protocol realization module is implemented within a dynamic field programmable gate array and within a software controlled processor. The protocol sensing module is implemented within a control field programmable gate array, and wherein the reconfiguration control engine, and the protocol selection module are implemented within the control field programmable gate array and a software controlled processor.

The protocol sensing module is comprised of a course acquisition loop for generation of multiple confidence states of valid protocol detection, and a fine tracking loop for allowance of some degradation of information content. The protocol sensing module identifies network protocols by analyzing periodic frame headers and preambles. The protocol sensing module generates a command on detection of a network protocol and the reconfiguration control engine reconfigures the dynamic protocol realization in response to the command from the protocol sensing module. The protocol selection module fetches a stored network protocol from the memory in response to the command from the protocol sensing module. The protocol selection module interfaces the memory with the reconfiguration control engine.

The invention is also defined as a method of performing the functions of the modules disclosed above.

While the apparatus and method has or will be described for the sake of grammatical fluidity with functional explanations, it is to be expressly understood that the claims, unless expressly formulated are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly so formulated they are to be accorded full statutory equivalents. The invention can be better visualized by turning now to the following drawings wherein like elements are referenced by like numerals.

Figure 1:
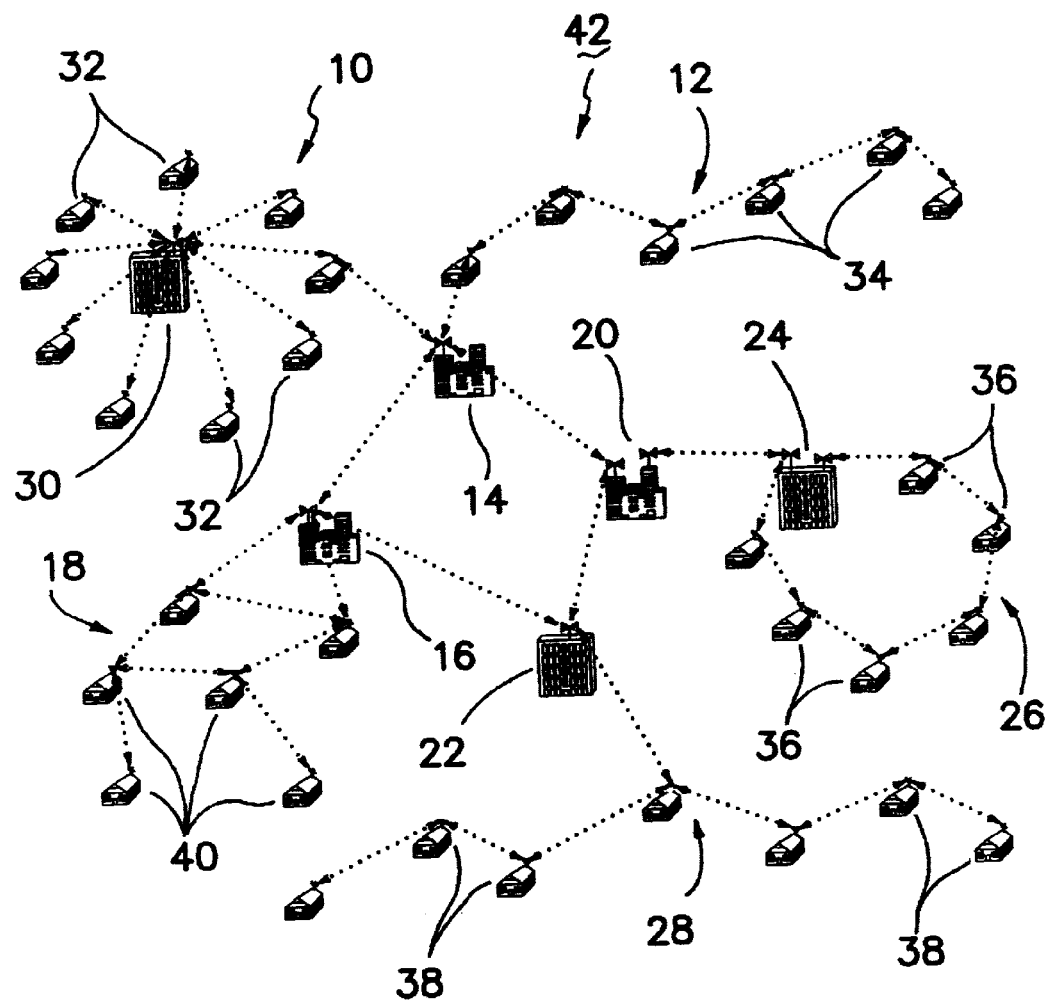
FIG. 1 is diagram of a collection of networks in which the invention is employed.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention is directed to an apparatus and a method for providing an architecture and a hardware implementation for realizing an earth- or space-based dynamic reconfigurable protocol chip for wireless computer networks. This architecture, its associated object oriented design methods, and partial reconfiguration techniques enable rapid autonomous reconfiguration of communications network functions. This reconfiguration provides long-life communications infrastructure, enables dynamic operation within networks with heterogeneous nodes, and compatibility between heterogeneous networks, i.e. distributed networks using different protocols.

The development of such radios and the network protocol chip presented here require defining the correct combination of processing methods ("objects") and developing appropriate dynamic reconfiguration techniques as a function of system goals and operating parameters. Dynamic reconfiguration techniques to be developed as part of this effort include autonomous network/protocol identification and autonomous network node reconfiguration.

In the case of space-based communications among networks of satellites the requirements that drive the section and performance criteria of the protocols include but are not limited to the following:

1. Bandwidth, latency, bit-error rate, link admission, handoff, flow control, bad balancing, route availability/adaptability
   a. Science data traffic
   b. Engineering data traffic
      i. Diagnostic data
      ii. Control data
      iii. Navigation data
2. Spacecraft configuration/topology
   a. Number of spacecraft
   b. Homogeneous versus heterogeneous nodes
   c. Standard topology (star, ring, string-of-pearls)
3. Mission cost/schedule/risk
   a. Trades between QoS and mission cost, schedule, and risk might dictate adoption of network protocols that are otherwise suboptimal
   b. Protocol maturity and reliability The criteria presented impose the use multiple space network communication protocols. Lack of standardization and commercial competition can be expected to provide a plurality of different network communication protocols in earth-based networks. In particular networks that have heterogeneous nodes or when two or more networks use different network protocols (derived from their respective network requirements) there is a need for resource sharing; these networks should be able to communicate with nodes in another network. The invention reduces the cost and risk of future wireless networks by enabling internetworking compatibility and therefore more general resource sharing.

The above requirements result in the following technology needs:
1. Enable resource sharing and network compatibility among heterogeneous networks (i.e. multiple distributed spacecraft missions or multiple earth-based networks each operating a different network protocol) or networks with heterogeneous nodes.
2. Enable reconfigurable network links.
3. Reduce the overall infrastructure cost by developing a common platform for realizing network protocols.

FIG. 1 is a diagrammatic depiction of a heterogeneous collection of wireless networks 10, 12, 18, 24 and 28 together with a plurality of hubs, servers or bridges 14, 16, 20, 22, 24 and 30. Each network uses a different networking protocol. Network 10 is comprised of a plurality of users 32 each of which are directly communicated by hardline or wireless links to a central server 30 in a star formation. Server 30 is communicated by a hardline or wireless link to server 14, which is dedicated to a linear chain of wireless users 34 comprising network 12. Server 14 is communicated by a hardline or wireless link to bridge 20, which in turn is communicated by a hardline or wireless link to servers 22 and 24. Server 24 is dedicated to network 26 comprised of users 36 interconnected in a wireless loop. Server 22 is dedicated to network 28 comprised of users 38 interconnected in a wireless tree. Server 16 is communicated by a hardline or wireless-links to both servers 14 and 22 and to a plurality of arbitrarily communicated users 40. Altogether all the networks and users of FIG. 1 comprise a collective intercommunicated network 42 according to the invention.

The invention can be thought of as divided into three overlapping components to be integrated into a single system, namely the reconfigurable protocol chip. The first component is an apparatus and method for autonomous protocol detection and application of object oriented design methods for realizing these methods in hardware/software. The protocol detection algorithms are parameterized and developed assuming representative fundamental physical layer properties of existing protocols.

The second component is the overall reconfigurable protocol chip architecture. This architecture includes pseudo-dynamic reconfigurable objects that implement the reconfiguration engine of a field programmable gate array (FPGA) or other processor, related hardware and software components of the architecture, as well as integration of the protocol detection algorithms. The architecture also includes the integration of commercial-off-the shelf protocol implementations.

The third component is the architecture realized via a reconfigurable hardware chip(s). The chip is characterized by an autonomous protocol sensing capability and autonomous pseudo-dynamic protocol chip reconfiguration capability.

Figure 2:
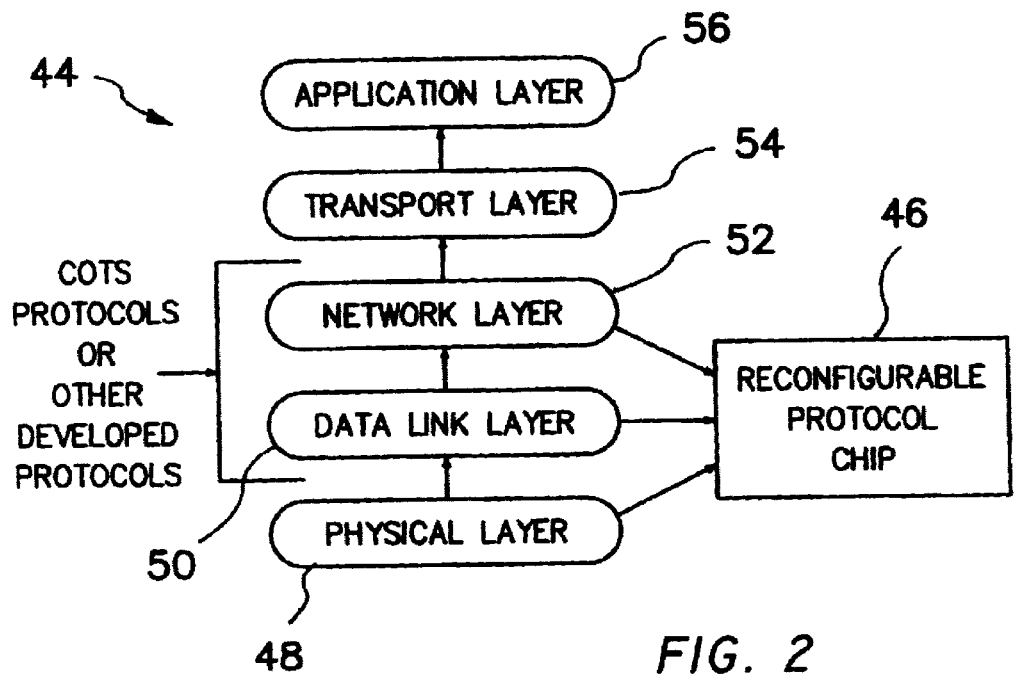
FIG. 2 is a block diagram of the communication layers with which the reconfigurable protocol chip of the invention is employed.

FIG. 2 illustrates the network layers of the protocol stack, generally denoted by reference numeral 44, which is implemented in protocol chip 46. Protocol stack 44 is comprised a physical layer 48 which includes all the users, servers, hubs, bridges and other elements of network 42 of FIG. 1. These elements are in wireless communication with chip 46. Data link layer 50 is a commercial-off-the-shelf or later developed software or hardware element, which handles data communication from and to physical layer 48. Network layer 52 is a commercial-off-the-shelf or later developed software or hardware element, which handles network coordination and communication of data flowing from and to physical layer 48 through data link layer 50. Network layer 52 includes the various network protocols, which separate or alienate the various networks of FIG. 1 from each other. Transport layer 54 is a commercial-off-the-shelf or later developed software or hardware element, which handles the transport of files between elements in the network, such as by means of conventional TCP/IP protocols. Application layer 56 is a commercial-off-the-shelf or later developed software or hardware element, which provides the user application or access to the networks of FIG. 1, such as a network browser. In the illustrated embodiment layers 50 and 52 are included within or considered part of chip 46, while layers 48 and 54 are in communication with chip 46.

Figure 3:
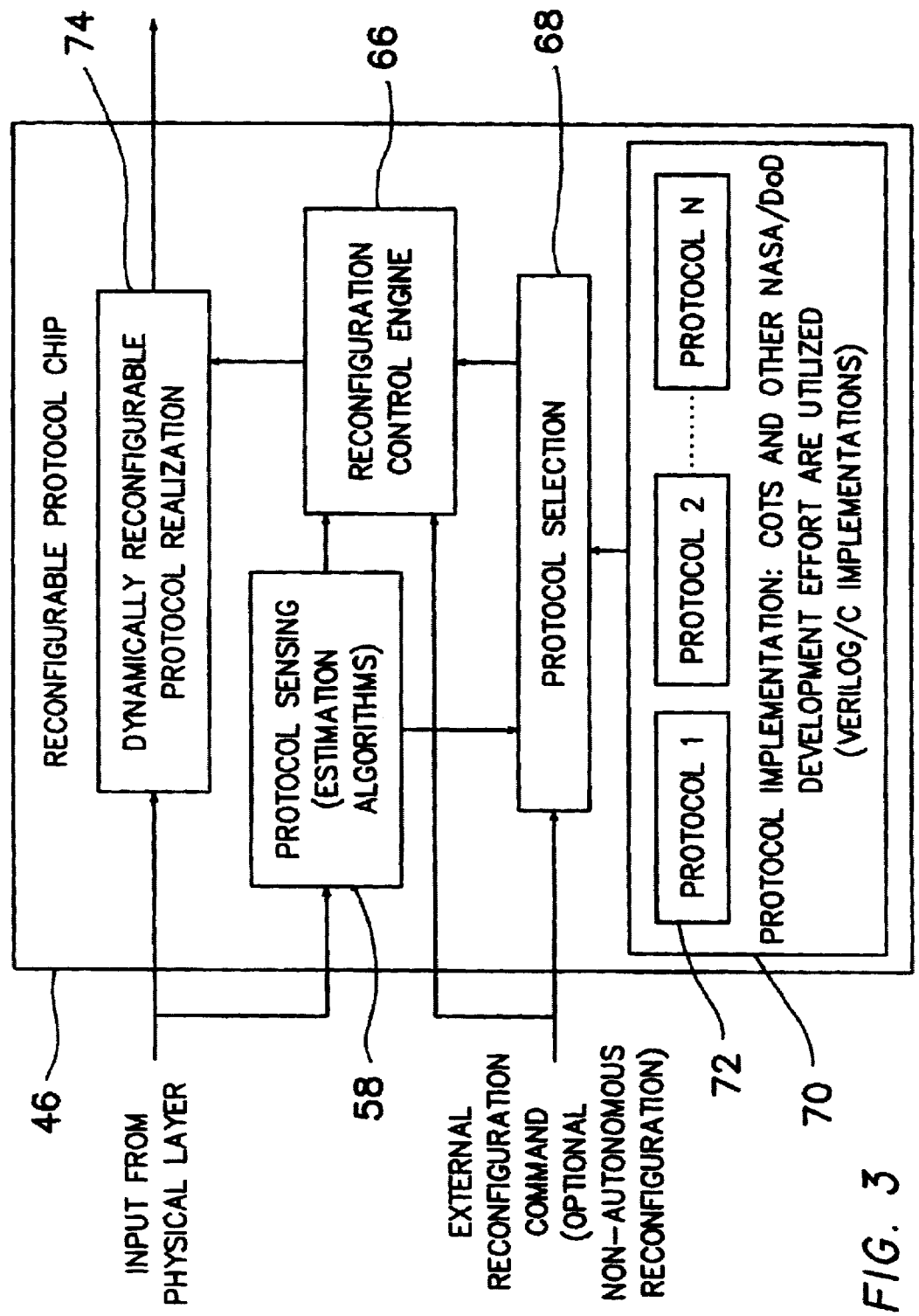
FIG. 3 is a block diagram the operational modules included within the reconfigurable protocol chip.

FIG. 3 illustrates the architecture of the reconfigurable protocol subsystems of chip 46. Reconfigurable protocol chip 46 has the following features:
a. Network Sensing: ability to discover network protocols quickly and autonomously.
b. Flexible Implementation Platform: chip 46 has the resources (Operations per second, memory etc.) to implement a wide variety of network protocols
c. Dynamic Network Reconfiguration: chip 46 can reconfigure/program itself autonomously based on its network sensing input or other authorized input.
d. Network Upgrades: chip 46 is upgradeable or enhanced years after installation through over-the-air reconfiguration.

Figure 4:
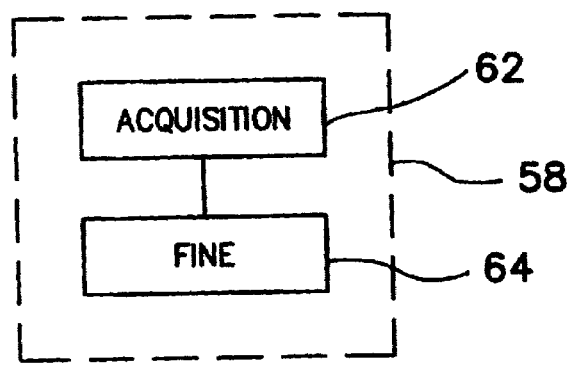
FIG. 4 is a block diagram of the protocol sensing module showing its component submodules.

Autonomous protocol sensing/detection algorithms stored or hardwired into protocol sensing module 58 in FIG. 3 coupled to physical layer 48 look at the periodic frame headers, preambles, etc. to identify the appropriate network protocol. Sensing modules 58 is comprised of a course acquisition loop 62 and a fine tracking loop 64 diagrammatically depicted in FIG. 4, where course acquisition loop 62 contains multiple confidence states of valid protocol detection and fine tracking loop 64 allows for a level of degradation due to physical and topological interferences.

Reconfigurable control engine 66 is responsible for reconfiguring the dynamic protocol realization when given a command from either the protocol sensing module 58 or some external source. The protocol selection module 68 receives a command from either protocol sensing/detection module 58 or an external source telling it which network protocol 72 to access from memory storage 70. Protocol selection module 68 acts as an interface between memory 70 and reconfigurable control engine 66.

Protocol sensing module 58, reconfiguration control engine 66, protocol selection module 68, and network protocol configuration files 72, which network protocol configuration files are stored in flash memory, remain relatively static (i.e. these modules may be updated over time as new protocols are developed). The operation of dynamic protocol realization module 74 constantly changes with incoming data from physical layer 48 to accommodate different network protocols. These modules are built around field programmable gate arrays (FPGAs) and reduced instruction set chip microprocessors (RISC) are favored over digital signal processors (DSPs) due to the nature of the processing required, the bandwidth, power demands and flexibility obtainable with FPGAs, and the environment in which the dynamic module 74 operates in space-based embodiments. In a space-based embodiment FPGAs are chosen because space flight qualified parts are available, partial reconfiguration of the FPGA is possible, FPGAs are immune to latch ups, and prior experience with tools and prototype parts are available. A RISC has high MIPS/Watt ratio, excellent board support package, and radiation tolerant parts are available.

Figure 5A:
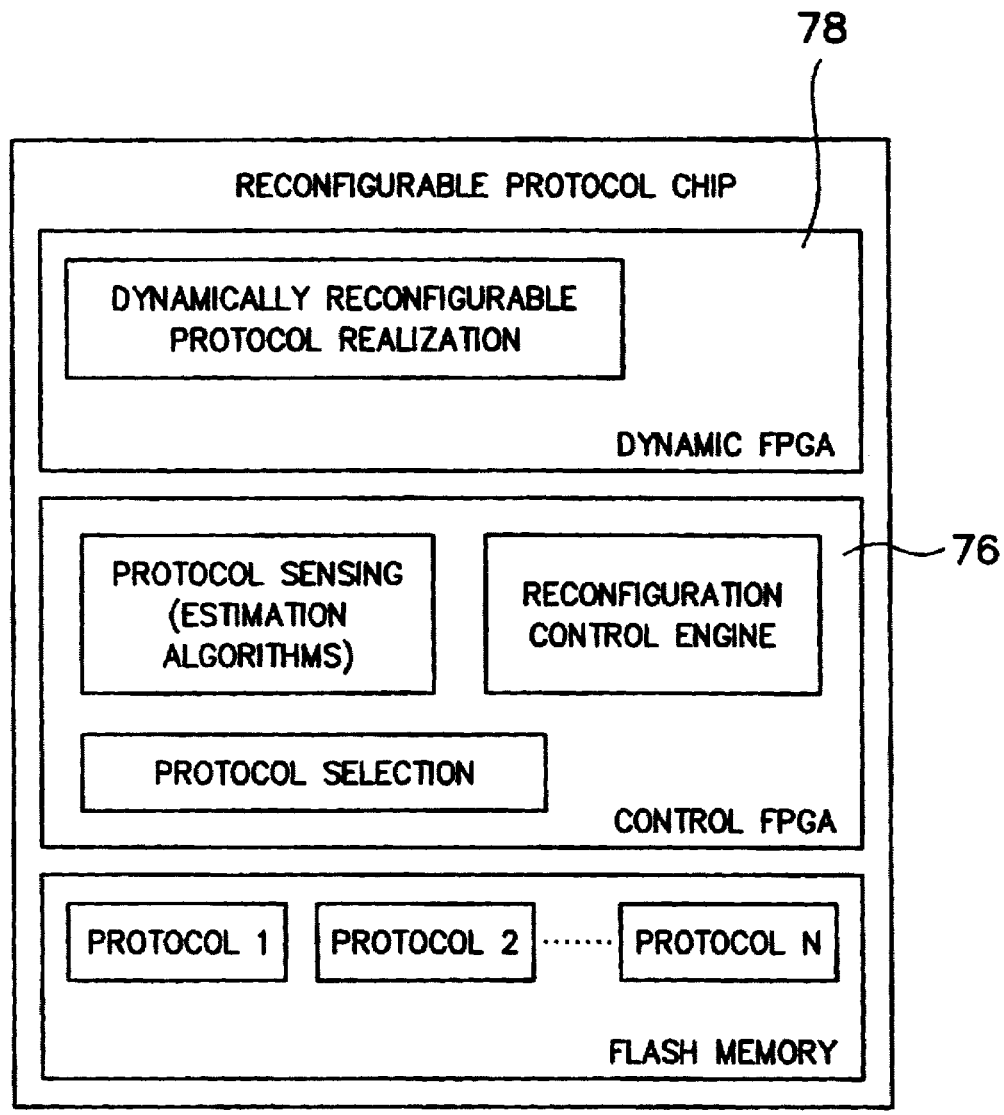
FIG. 5a is a block diagram of a first embodiment of the reconfigurable protocol chip implemented in two field programmable gate arrays.

In the illustrated embodiment as shown in FIG. 5a the architecture contains FPGA processing; specifically residing in two FPGAs 76 and 78. All static modules of FIG. 3 (except network protocol configuration files 72 which are stored in a flash memory) are implemented in a control FPGA 76. The dynamic realization of different network protocols is implemented in a dynamic FPGA 78.

Figure 5B:
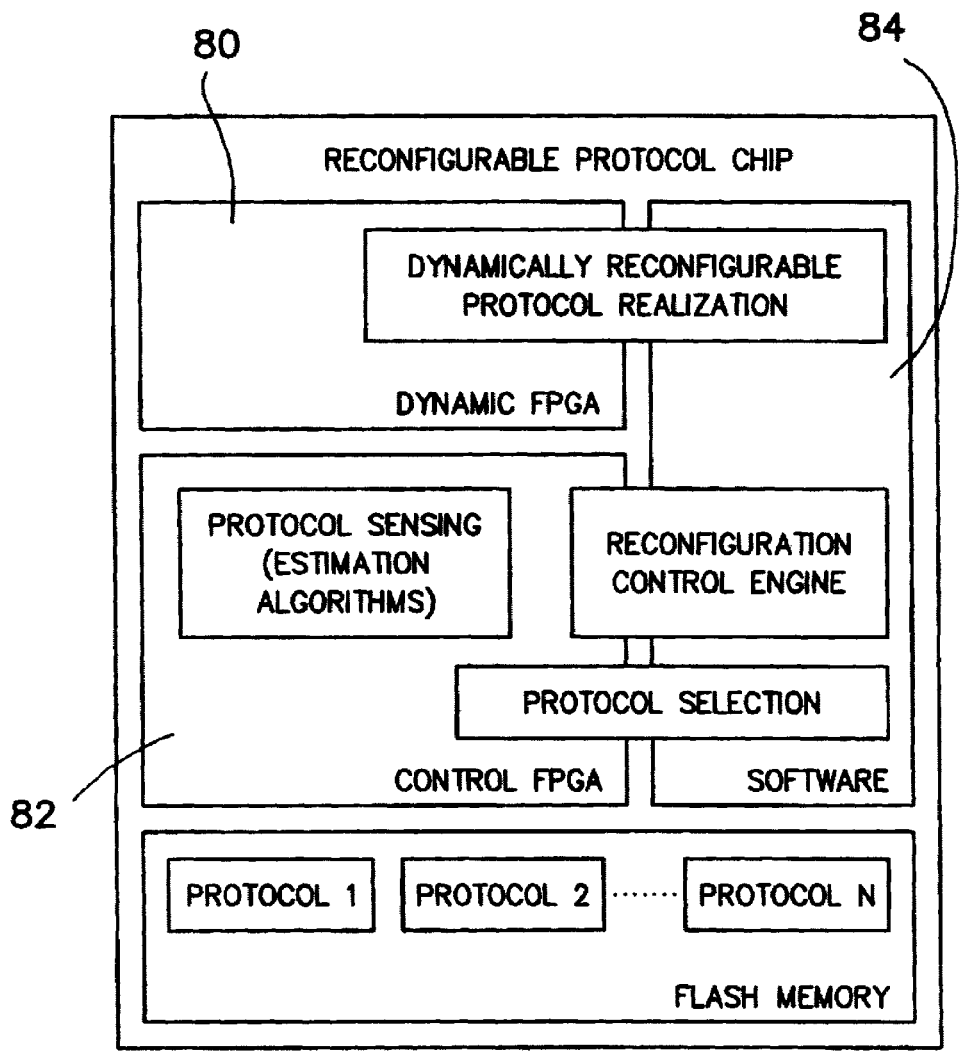
FIG. 5b is a block diagram of a second embodiment of the reconfigurable protocol chip implemented in two field programmable gate arrays and a software controlled processor.

A second embodiment shown in FIG. 5b chip 46 is implemented in either dynamic FPGA 80 or control FPGA 82 or both and in a software controlled microprocessor 84. Static modules are implemented in control FPGA 82 and software microprocessor 84. The dynamic realization of different network protocols is implemented in both dynamic FPGA 80 and software microprocessor 84.

The first embodiment of FIG. 5a consumes less power, but the second embodiment of FIG. 5b provides more flexibility. Upper layers in the network protocol stack 44 of FIG. 2 usually favor software implementations over hardware. As protocols become more advanced, having a microprocessor 84 in chip 46 will be more convenient. For any architecture, some form of flash memory 70 is needed to store the different network protocol configuration files 72.

One larger FPGA can be used in place of the control and dynamic FPGAs 76 and 78 or 80 and 82. However, partial reconfiguration of the FPGA will be required. True real-time partial reconfiguration in a single FPGAs implementing complex and high rate processing is beyond the current state-of-the art, although having one FPGA does have the advantage of smaller mass and volume.

The proposed architecture extends Moore's law to Internet bandwidth and thereby offers an economic benefit. Moore's law, which is not really a law but an informal prediction that closely approximates what has been observed in industry, states that the numbers of transistors per unit area in microprocessors double about every 18 months. The consequences of Moore's law include both increasing capacity of the affected equipment and lower per-unit costs. The extension of Moore's law to Internet bandwidth has been estimated to offer the potential to reduce the cost of 1 Mb/s of Internet bandwidth to only $1 per month after ten years.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for reconfiguring a plurality of networks, each having a different network protocol into an intercommunicated network and a physical layer communicated to the plurality of networks comprising:
   a protocol stack; and
   a reconfigurable protocol chip coupled the protocol stack wherein the reconfigurable protocol chip is comprised of:
      a dynamically reconfigurable protocol realization module communicated to the physical layer;
      an autonomously functioning protocol sensing module communicated to the physical layer having and controlled by autonomous protocol sensing/detection algorithms;
      a reconfiguration control engine communicated to the autonomously functioning protocol sensing module and to the dynamically reconfigurable protocol realization module;
      a protocol selection module communicated to the autonomously functioning protocol sensing module and to the reconfiguration control engine; and
      a memory for storing a plurality of different network protocols coupled to the protocol selection module,
   wherein the autonomously functioning protocol sensing module is comprised of a course acquisition loop for generation of multiple confidence states of valid protocol detection, and a fine tracking loop for allowance of some degradation of information.

2. The apparatus of claim 1 where the autonomously functioning protocol sensing module identifies network protocols by analyzing periodic frame headers and preambles.

3. The apparatus of claim 1 where the autonomously functioning protocol sensing module autonomously generates a command on detection of a network protocol and where the reconfiguration control engine reconfigures the dynamic protocol realization in response to the command from the autonomously functioning protocol sensing module.

4. The apparatus of claim 1 where the autonomously functioning protocol sensing module autonomously generates a command on detection of a network protocol and where protocol selection module fetches a stored network protocol from the memory in response to the command from the autonomously functioning protocol sensing module.

5. A method for reconfiguring a plurality of networks, each having a different network protocol into an intercommunicated network comprising:
communicating a dynamically reconfigurable protocol realization module to a physical layer coupled to the plurality of networks;
autonomously operating a protocol sensing module coupled to the physical layer to detect a valid network protocol from the plurality of networks communicated through the physical layer to the sensing module having and controlled by autonomous protocol sensing/detection algorithms;
generating multiple confidence states of valid protocol detection in a course acquisition loon included in the protocol sensing module and allowing some degradation of information in a fine tracking loon included in the protocol sensing module;
commanding a reconfiguration control engine to dynamically reconfigure a protocol realization module by autonomous detection of a valid network protocol by the protocol sensing module;
selectively controlling a selection module coupled to the protocol sensing module and to the reconfiguration control engine; and
communicating with a memory for storing a plurality of different network protocols to the protocol sensing module through the selection module.

6. The method of claim 5 further comprising identifying network protocols in the protocol sensing module by analyzing periodic frame headers and preambles.

7. A protocol stack in a reconfigurable protocol chip for reconfiguring a plurality of wireless networks into an intercommunicated wireless network without user intervention, each network having a different network protocol, comprising:
a physical layer communicated to the plurality of wireless networks;
an autonomously operating protocol sensing module communicated to the physical layer and controlled by autonomous protocol sensing/detection algorithms for processing periodic frame headers and preambles from the wireless networks to identify an appropriate network protocol corresponding to the wireless network communicated to the physical layer, the sensing modules having a course acquisition loop and a fine tracking loop, where course acquisition loop generates multiple confidence states of valid protocol detection and fine tracking loop allows for a level of degradation due to physical and topological interferences with communication with the wireless network; and
means for reconfiguring the protocol chip to communicate with the communicated network with an appropriate network protocol, each wireless network in the plurality of wireless networks being provided with a corresponding protocol stack in a corresponding reconfigurable protocol chip so that the plurality of networks are autonomously configured into an intercommunicated wireless network without user intervention regardless of differences in the network protocols used by the plurality of networks.

* * * * *

UNITED STATES PATENT AND TRADEMARK OFFICE
CERTIFICATE OF CORRECTION

PATENT NO.        : 7,602,792 B2                                              Page 1 of 1
APPLICATION NO. : 10/318477
DATED             : October 13, 2009
INVENTOR(S)       : Gray et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1470 days.

Signed and Sealed this

Fifth Day of October, 2010

David J. Kappos
*Director of the United States Patent and Trademark Office*